United States Patent
Trikalinou (10) Patent No.: US 10,474,814 B2
(45) Date of Patent: Nov. 12, 2019

(54) SYSTEM, APPARATUS AND METHOD FOR PLATFORM PROTECTION AGAINST COLD BOOT ATTACKS

(71) Applicant: Intel Corporation, Santa Clara, CA (US)

(72) Inventor: Anna Trikalinou, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 15/278,250

(22) Filed: Sep. 28, 2016

(65) Prior Publication Data

US 2018/0089425 A1    Mar. 29, 2018

(51) Int. Cl.
*G06F 21/55* (2013.01)
*G06F 21/70* (2013.01)

(52) U.S. Cl.
CPC ............ *G06F 21/554* (2013.01); *G06F 21/70* (2013.01); *G06F 2221/034* (2013.01); *G06F 2221/2143* (2013.01)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

| | | | |
|---|---|---|---|
| 8,650,639 B2 | 2/2014 | Adams et al. | |
| 2012/0033519 A1* | 2/2012 | Confalonieri | G11C 16/3431 365/222 |
| 2012/0079593 A1* | 3/2012 | Adams | G06F 21/554 726/23 |
| 2013/0137940 A1* | 5/2013 | Schafer | A61B 10/0012 600/301 |
| 2015/0161392 A1* | 6/2015 | Krummel | G06F 21/554 726/22 |
| 2015/0356300 A1* | 12/2015 | Teglia | G06F 21/554 726/22 |
| 2016/0098360 A1* | 4/2016 | Gillespie | G06F 21/602 711/104 |
| 2016/0117264 A1* | 4/2016 | Hyde | G06F 21/00 713/193 |

FOREIGN PATENT DOCUMENTS

WO    2010076826    7/2010

OTHER PUBLICATIONS

International Searching Authority, "Notification of Transmittal of the International Search Report and the Written Opinion of the International Searching Authority," dated Jan. 4, 2018, in International application No. PCT/US2017/053598.

International Searching Authority, "Notification of Transmittal of the International Search Report and the Written Opinion of the International Searching Authority," dated Nov. 16, 2018, in International application No. PCT/US2017/053596.

* cited by examiner

*Primary Examiner* — Sharif E Ullah (74) *Attorney, Agent, or Firm* — Trop, Pruner & Hu, P.C.

(57) ABSTRACT

In an embodiment, an apparatus includes: an interface circuit to receive thermal information from a system memory; a calculation circuit to determine a rate of thermal change of the system memory based on a current temperature of the system memory, a prior temperature of the system memory and a time duration; and a policy enforcement circuit, in response to a result of a comparison of the rate of thermal change to a threshold, to perform at least one protection measure on the system memory. Other embodiments are described and claimed.

17 Claims, 6 Drawing Sheets

SYSTEM, APPARATUS AND METHOD FOR PLATFORM PROTECTION AGAINST COLD BOOT ATTACKS

TECHNICAL FIELD

Embodiments relate to detection and protection against computer system attacks.

BACKGROUND

As more of modern life becomes dependent on computing systems, different attack mechanisms for gaining unauthorized access to a computing system and/or its data continue to raise security concerns. One particular attack technique is a so-called cold boot attack, in which an attacker has physical access to a target system and is able to read contents of main memory without having the appropriate administrative level privileges. The basis of this attack is an inherent hardware issue of memories (such as dynamic random access memories and static random access memories), which retain information for a period of time even after power has been removed from them. During this period of time, an attacker can read all remaining data and thus expose any stored secrets. Note further that this period of time directly depends the temperature of the memory module, and the time for data to become non-retrievable decreases exponentially as temperature rises. To this end, attackers may use a cooling mechanism to extend the lifetime of data. Then the attack may proceed by either rebooting the system with another operating system (OS) under the attacker's control or by physically removing the memory and inserting it into another system that is under the attacker's control.

This attack can dramatically impact security of the system, as main memory often contains secrets such as disk encryption keys, usernames and passwords to bypass boot authentication, to then retrieve privileged code and configuration data. Current techniques to protect against security attacks include encrypting parts or all of the memory. However, encryption does not prevent an attacker from retrieving encrypted and unencrypted memory alike. Other techniques suffer from complexity and the possibility of false positive attack detections.

DETAILED DESCRIPTION

In various embodiments, techniques and mechanisms are provided for detecting and protecting against a cold boot attack on a computer system. Since cold boot attacks rely on cooling memory modules to extend data remanence in memory (e.g., from just fractions of a second on a room temperature dual inline memory module (DIMM) up to a couple of minutes on a frozen DIMM), embodiments may capture a sudden and unnatural temperature drop and trigger an incidence response mechanism to protect the system's secrets. Other heuristics could potentially be used as attack indications, such as contact sensors that indicate whether the system's case is opened. If an attack is detected, various protection measures may be performed, as described herein. For example, a hardware exception may be signaled, an owner of the system can be notified that an intrusion was detected and, depending on the administrator's preferences, some or all data residing in memory can be erased or re-encrypted using a different key. Thus, the attacker will not be able to extract any information by reading the memory, and consecutive attacks will yield different key-encrypted information each time.

Figure 1:
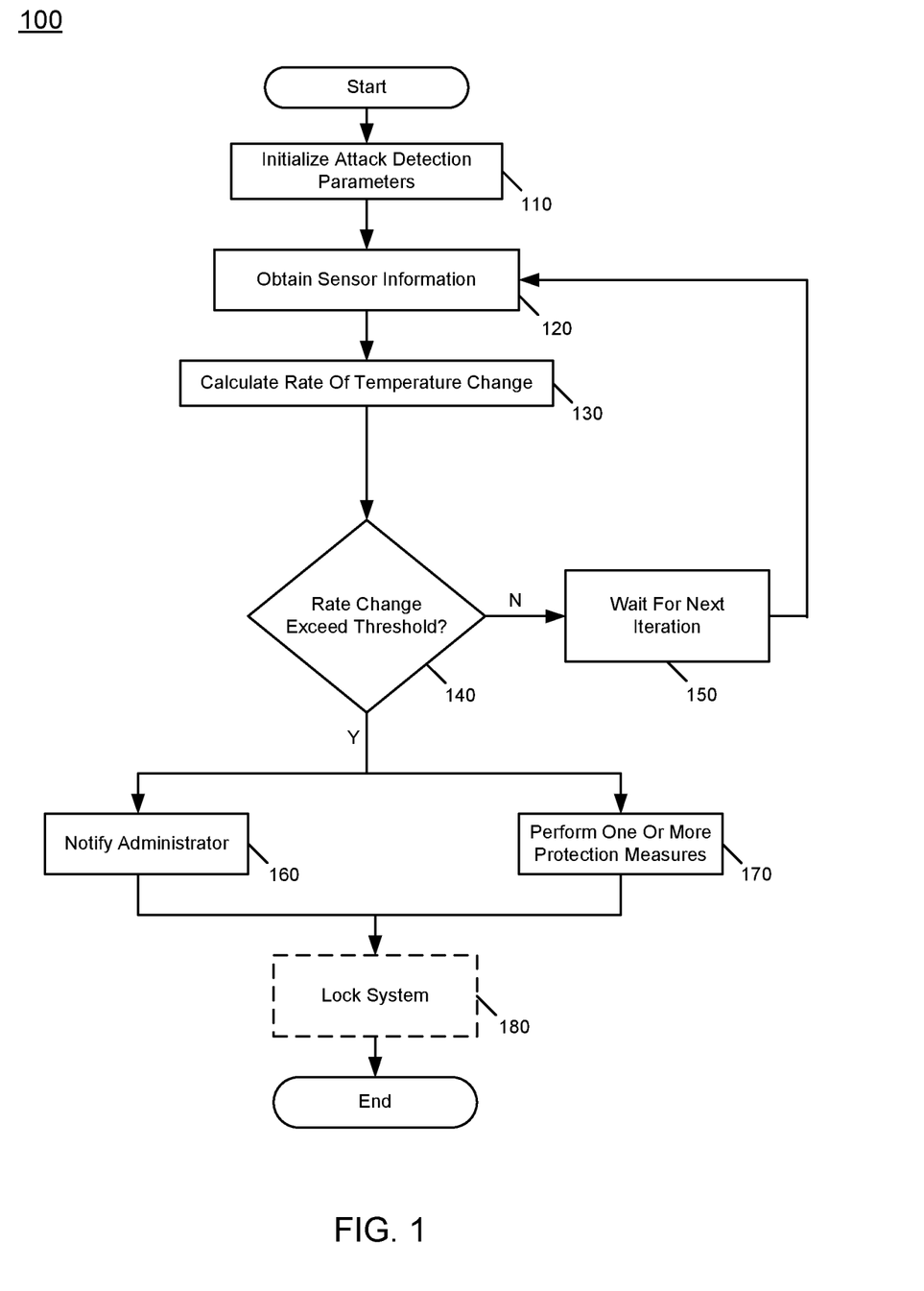
FIG. 1 is a flow diagram of a method in accordance with an embodiment of the present invention.

Referring now to FIG. 1, shown is a flow diagram of a method in accordance with an embodiment of the present invention. More specifically, FIG. 1 illustrates method 100 for protecting a given platform from certain attacks such as a cold boot attack. In various embodiments, method 100 may be performed by hardware, software, and/or firmware or combinations thereof. While it is possible for the attack detection of method 100 to occur via a central processing unit (CPU)-based mechanism, many embodiments may use an independent mechanism. For example in some embodiments, a system may include an Intel® Manageability Engine (ME) to monitor the system and perform power management and security operations. Such ME may include a processor that operates independently and transparently from the CPU and the running OS. In such embodiments, the attack detection may be implemented in ME firmware, to ensure that the check is performed at all times (from early boot time, until after the system has been powered off), cannot be bypassed by an attacker, and does not impose any performance overhead to the system. In other cases without a ME, the attack detection may be implemented as a kernel module in the CPU or in a microcontroller such as an embedded controller. Other alternatives for an entity responsible for monitoring the system are possible, each with different security/complexity/cost trade-offs. For example a power manager unit for client, server and mobile platforms may be used, or additional hardware embedded in a memory controller or in a memory itself may be used. In some such implementations, this arrangement may enable no dependences on a host processor.

In one example, method 100 may be performed by an attack detection logic of a system. For purposes of discussion, assume that the platform is a desktop computer or server computer having a system memory formed of one or more DIMMs. In other cases, embodiments may be used in a variety of platforms ranging from small portable devices such as Internet of Things (IoT) devices, smartphones, tablet computers or laptop computers, to data center equipment, including server racks, storage racks and so forth.

As illustrated, method 100 begins by initializing attack detection parameters (block 110). For example, upon startup of a platform, these attack detection parameters may be obtained and stored. These attack detection parameters may include a threshold value, which in an embodiment may take the form of a rate threshold and a time duration, indicating a periodicity at which the attack detection is to be performed. Of course in other embodiments where other contact sensors are used to indicate a closed/opened case or removed components, additional attack detection parameters may also be initialized. Although the scope of the present invention is not limited in this regard, in an embodiment these parameters can be received on startup from an appropriate storage. As examples, these attack detection parameters may be part of system software such as in the case of an OS or BIOS-based mechanism. In other cases, these parameters may be obtained from a non-volatile storage, such as firmware or microcode of a controller in which the attack detection is to be performed. Note that these attack detection parameters can be stored, e.g., in configuration registers of this secure processor or other entity that is to perform the attack detection.

Control next passes to block 120 where attack detection operations may begin. More specifically, at block 120 sensor information may be obtained. Although the scope of the present invention is not limited in this regard, this sensor information may be obtained from one or more thermal sensors associated with the system memory, such as one or more thermal sensors implemented on-die or otherwise implemented within a DIMM module or other memory structure. In an embodiment, this sensor information may be received at regular intervals as part of various status information provided from a memory to the platform. For example, in many cases a system memory may have a memory communication channel that couples to a memory controller, which in many embodiments may be implemented as an integrated memory controller of a main processor or other CPU or SoC.

In other cases, the attack detection logic can issue requests to receive this sensor information. Furthermore, understand that while the embodiments described herein are primarily with regard to a detection of an attack based on temperature change, other manners of detecting an attack may occur in other embodiments. For example, in some cases either in conjunction with or apart from a temperature change, a contact sensor can identify when a case or other platform enclosure has been broken apart. In still other embodiments, additional sensors to indicate attack detection may be provided.

Still with reference to FIG. 1, control next passes to block 130 where a rate of temperature change can be calculated. In an embodiment, to determine this rate of temperature change, a prior sensor value may be used along with a sensor value obtained from the currently received sensor information. In addition, timing information associated with these two sensor values can be used. In some cases, instead of receiving or associating a time indicator with each sensor value, it can suffice to maintain a sampling interval value to indicate a sampling rate. In one embodiment, from these three values, a thermal change rate can be determined according to:

$$\Delta T = T2 - T1/\text{Time Duration} \quad [\text{EQ. 1}],$$

where T1 and T2 correspond to the sensor values recorded at time instances T1 and T2, respectively and Time Duration corresponds to the time (e.g., in order of seconds) between the two samples. Understand that in some embodiments, the time duration can be implied such that a difference between thermal values can be sufficient to determine a rate of change (where the corresponding threshold is also in terms of a difference). Based upon this calculation, a rate of thermal change can be determined. Of course in other embodiments, instead of calculating this rate of thermal change, another calculation to determine a metric relating to attack possibility may occur.

Still with reference to FIG. 1, control next passes to diamond 140 where it is determined whether the rate of change exceeds a threshold. As discussed above, this threshold may be a rate threshold and may be set as a platform parameter. Although the scope of the present invention is not limited in this regard, in an embodiment this rate threshold may be between approximately 1 and 3 degrees per half second. If at diamond 140 it is determined that the rate change does not exceed the threshold, control passes to block 150 where the attack detection logic can wait for a next iteration of method 100. If it is determined that the rate change exceeds this threshold, this is an indication of a potential cold boot attack. Thus where temperature has dropped significantly since a last iteration, an incidence response mechanism is triggered.

Note that in some embodiments, the iteration of the loop activities can be controllable, to balance between quick attack detection and performance impact. In some cases, the attack detection may be performed in different privilege levels. For example, the attack detection logic can operate on VMM level (if existing) privilege, host OS level (if existing) privilege, host application level (if existing) privilege, guest OS-level privilege or guest application level privilege. Note that where the detection is more unprivileged, the more likely that a user/attacker with same privileges can interrupt it.

Still referring to FIG. 1, if a rate change exceeding the threshold is determined, control passes to one or more of blocks 160 and 170. That is, in some embodiments different protection measures may be taken responsive to this detection of an attack or potential attack. In some embodiments, both of blocks 160 and 170 may execute. In other cases only one block may execute for a given attack detection. As illustrated, at block 160 an administrator may be notified regarding the attack or potential attack. In an embodiment, this notification may be sent from the platform under attack to a central administrator, such information technology (IT) personnel responsible for the platform. In other cases, this notification may be routed to the registered system owner.

At block 170, one or more protection measures may be performed on the platform to prevent or at least mitigate misuse of data in the system memory of the platform under attack. In an embodiment, one protection measure may be to erase all data on the memory. In some embodiments, such erasing may be performed in a prioritized manner, such that the most sensitive data is erased first. In this way, should the attack occur and the DIMMs be pulled from the platform, the most sensitive data is likely to be erased or otherwise removed before the attacker has access to the information. For example, in some cases various encryption keys, including full disk encryption keys, encryption keys associated with encrypting of the system memory itself, user secrets such as usernames, passwords or so forth, all may be prioritized for erasure at a priority. In some cases this prioritization can be implemented via a priority table to indicate regions of memory to be erased first responsive to detection of an attack or potential attack.

Still with reference to FIG. 1, from both of blocks 160 and 170, control passes to optional block 180 where the system may be locked. That is, additional protection measures in the overall platform may occur to prevent further access to the system, including preventing access by both authorized and unauthorized users. For example, in the context of a remote server or platform, requests to access services of the platform can be responded to with a denial of service response, to ensure that additional sensitive information is not maintained in the platform until the attack is remedied. Note that attack detection as in FIG. 1 may be performed throughout system operation, rather than simply identifying temperature only during boot time. In this way, a cold boot attack detection can occur at any time, including during normal operation, during hibernate, OS login screen, etc., rather than simply at boot time. In addition, using an embodiment based on thermal rate change, false positives may be reduced or avoided as compared to a temperature-based detection which could especially occur in cases of very low-temperature environments or special industrial environments. Understand while shown at this high level in the embodiment of FIG. 1, many variations and alternatives are possible.

Note that the hardware for performing method 100 may be implemented, in one embodiment as an attack detection hardware logic (referred to herein also as an attack detection logic). Such logic in some embodiments may be dedicated hardware circuitry or logic that can be implemented within a general-purpose processor such as a CPU. In other embodiments this hardware logic may be implemented in a separate secure processor, such as a security co-processor, manageability engine, or other security engine. Note that in some cases this secure processor may be implemented with a single semiconductor package (and die) as the main CPU. In embodiments, this logic and the security processor itself may be transparent to the main CPU and OS. Of course other embodiments can be implemented in another type of trusted execution environment (TEE), such as available in a processor implementing Intel® Software Guard Extensions (SGX) circuitry.

Figure 2:
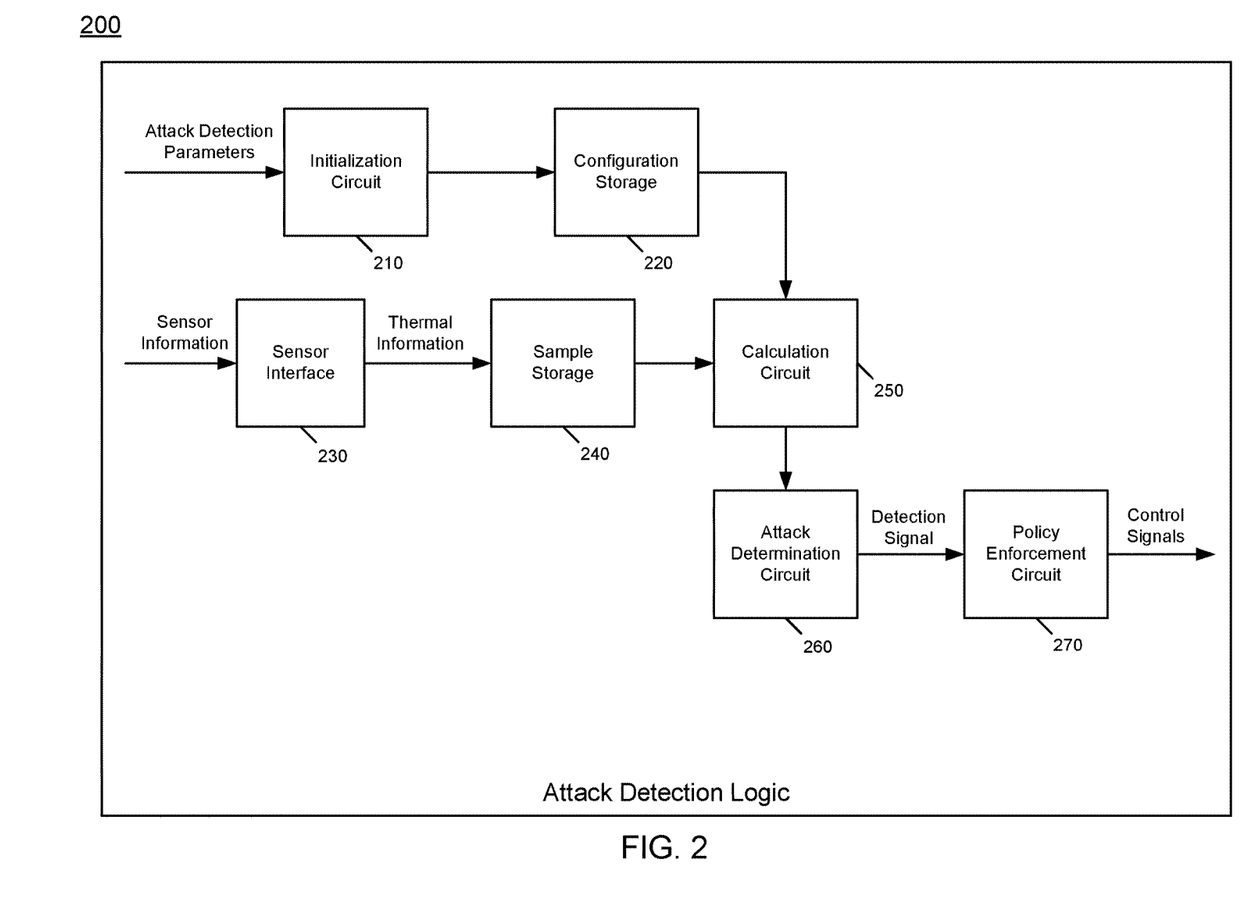
FIG. 2 is a block diagram of an attack detection logic in accordance with an embodiment of the present invention.

Referring now to FIG. 2, shown is a block diagram of an attack detection logic in accordance with an embodiment of the present invention. As shown in FIG. 2, attack detection logic 200 may be implemented as a set of circuits to perform the attack detection and platform protection techniques described herein. As described previously, in some cases this attack detection logic may be a dedicated hardware logic circuit of a platform. In other cases, this logic can be implemented within another processor such as a main CPU, security processor, microcontroller or so forth.

As illustrated, attack detection logic 200 includes an initialization circuit 210. Initialization circuit 210 may be configured to receive attack detection parameters, e.g., upon platform reset, and store such information in a configuration storage 220. Configuration storage 220 may be implemented as one or more configuration registers or other storage unit. After initialization, attack detection logic 200 is ready to perform its detection operations during normal system activities. As illustrated, incoming sensor information is received in a sensor interface 230. This sensor information may include thermal information, namely temperature information of one or more system memories. In some cases, the incoming sensor information may be in an already-processed form, such that the information provides a specific temperature reading for a given time instant. In some cases, a message that provides this temperature information may also include a timestamp. In other cases, such as where an integrated memory controller does not pre-process the information, the sensor information may be raw sensor data provided from one or more thermal sensors within the system memory. In such cases, sensor interface 230 may be configured to process the raw data to obtain temperature information. As illustrated, this thermal information may be stored in a sample storage 240. In some embodiments, sample storage 240 may be implemented as a first-in first-out (FIFO) buffer such that a given number of samples may be stored, and read from and written over in order.

Still with reference to FIG. 2, attack detection logic 200 further includes a calculation circuit 250. As seen, calculation circuit 250 receives thermal information from sample storage 240, along with one or more parameters from configuration storage 220. In various embodiments, calculation logic 250 may perform one or more calculations to determine a rate of temperature change of the associated system memory. In an embodiment, this calculation may be performed in accordance with EQ. 1, above. This rate change is communicated from calculation circuit 250 to an attack determination logic 260. When attack determination circuit 260 determines that a calculated rate of change exceeds a rate threshold, it sends a detection signal to a policy enforcement circuit 270. In various embodiments, policy enforcement circuit 270 may store one or more security policies associated with attack detections. As such, based upon an indication of an actual cold boot attack or potential attack by way of this detection signal, policy enforcement circuit 270 may issue one or more control signals, according to the policy.

As examples, policy enforcement circuit 270 may issue a hardware exception that indicates this cold boot attack. In various embodiments, this exception signal may be raised to cause other platform hardware, e.g., under control of firmware, to perform the protection measures described herein. In still other cases, policy enforcement circuit 270 also may issue an attack notification, e.g., to a given destination, such as an administrator. Of course additional options are possible according to a given security policy. Understand while shown at this high level in the embodiment of FIG. 2, many variations and alternatives are possible.

Embodiments may thus provide tamper protection against physical attacks to a platform with no performance cost. Using an embodiment, a system may be protected from attack, even in the case of the system being lost, stolen and/or physically attacked. In such cases, embodiments may prevent, e.g., administrator and end user login prompts and biometrics, among other secure data, from being bypassed due a physical attack on memory.

Figure 3:
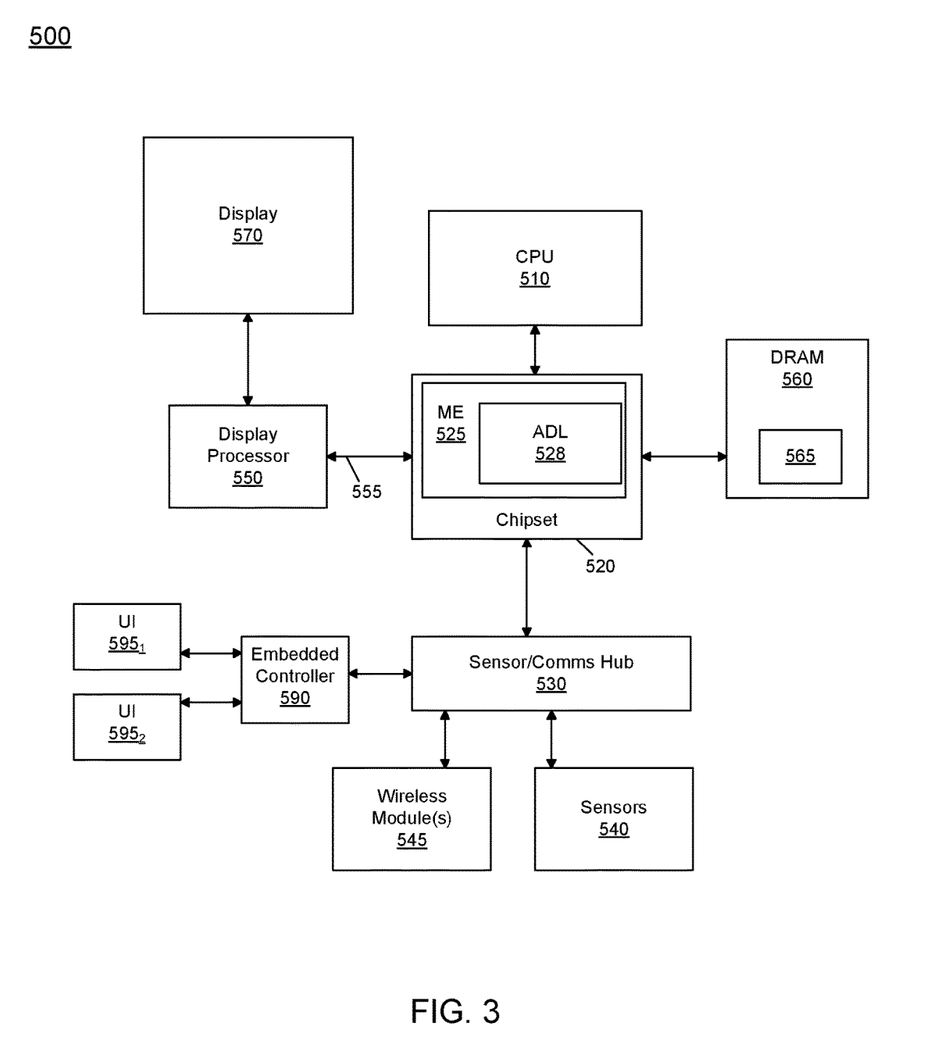
FIG. 3 is a block diagram of a system arrangement in accordance with an embodiment of the present invention.

Referring now to FIG. 3, shown is a block diagram of a system arrangement in accordance with an embodiment of the present invention. As seen in FIG. 3, system 500 may include a central processing unit (CPU) 510. In various embodiments, this CPU may be a SoC or other multicore processor and can include secure execution technologies such as Intel® SGX technology, Intel® Manageability Engine, or an ARM TrustZone to enable a trusted execution environment. This environment establishes a root of trust that evaluates the computing platform, including measuring platform components in the boot and launch environment (such as BIOS, an OS loader, virtual machine manager, and other components). This root also provides a trusted position to evaluate the integrity of any other component. Once a basic root of trust and a secure basis for measurement and evaluation is established, other mechanisms can be used to seal and protect secrets in memory, as well as provide local or remote attestation of system configuration.

As seen in the embodiment of FIG. 3, CPU 510 may be coupled to a chipset 520. Although shown as separate components in the embodiment of FIG. 3, understand that in some implementations chipset 520 may be implemented within the same package as CPU 510, particularly when the CPU is implemented as an SoC. As seen, chipset 520 may include a manageability engine 525 including an attack detection logic 528 which can perform the attack detection based on thermal change rate and initiate one or more protection measures based at least in part on detection of such rate exceeding one or more thresholds, as described herein.

As illustrated, chipset 520 couples to a DRAM 560, which may include one or more DIMMs. As illustrated, DRAM 560 may include one or more thermal sensors 565, such as on-die thermal sensors to provide thermal information to attack detection logic 528. In some embodiments, DRAM 560 may be configured with full memory encryption such that all information on the memory is stored in encrypted format, in some cases.

In the embodiment of FIG. 3, additional components may be present including a sensor/communications hub 530 which may be a standalone hub or configured within chipset 520. As seen, one or more sensors 540 may be in communication with hub 530. As examples for purposes of illustration, the sensors may include a GPS module or other such dedicated location sensor. Other sensors, such as inertial and environmental sensors may be present. Also, in various embodiments one or more wireless communication modules 545 may also be present to enable communication with local or wide area wireless networks such as a given cellular system in accordance with a 3G or 4G/LTE communication protocol.

As further seen in FIG. 3, platform 500 may further include a display processor 550 that can be coupled to ME 525 via a channel 555. As seen, display processor 550 may couple to a display 570 that can be a touch screen display. Note that the input channels from these components to ME 525 may be an untrusted channel. Similarly, other user interfaces, namely user interfaces 595$_1$ and 595$_2$ which in an example can be a keyboard and a mouse, may be coupled via an embedded controller 590 to the sensor/communications hub 530.

Figure 4:
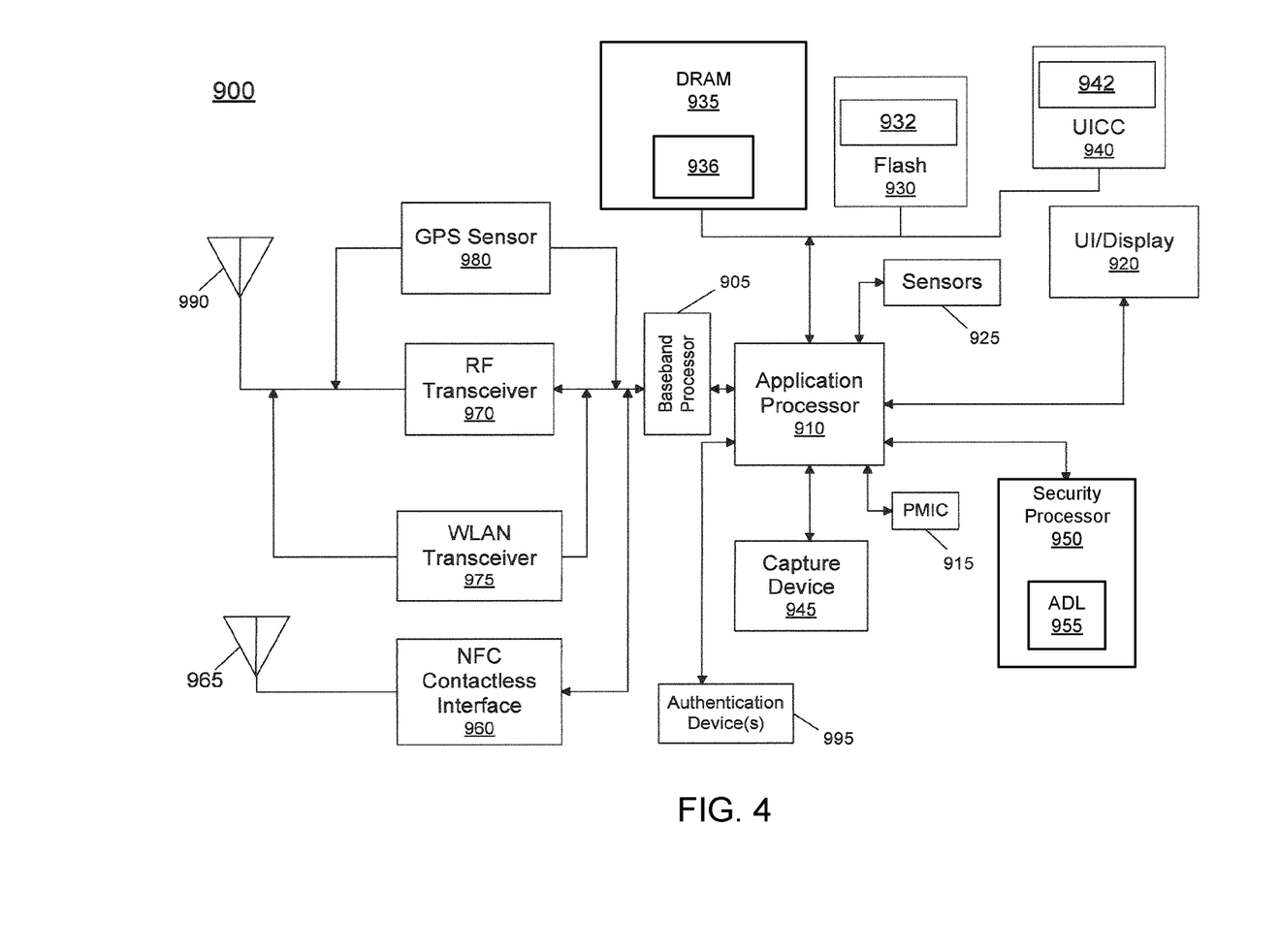
FIG. 4 is a block diagram of an example system with which embodiments can be used.

Referring now to FIG. 4, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. As illustrated, DRAM 935 may include one or more thermal sensors 936 configured to detect temperature of one or more memory devices. As examples, thermal sensors 936 may be implemented as on-die thermal sensors. This thermal information may be communicated back to application processor 910. In different embodiments, application processor 910 may include attack detection logic as described herein. In other cases, the attack detection logic may be located in another component of system 900. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 4, a universal integrated circuit card (UICC) 940 comprises a subscriber identity module, which in some embodiments includes a secure storage 942 to store secure user information. System 900 may further include a security processor 950 that may implement a TEE, and which may couple to application processor 910. As an example, security processor 950 may include attack detection logic 955 configured to perform the cold boot attack detection and execution of protection measures as described herein. To this end in such embodiments, application processor 910 may send the thermal information received from DRAM 935 to security processor 950. Note that in some cases, in addition to protecting DRAM, similar sensors and protection measures may be afforded for flash memory 930 and any other storage devices within system 900.

Furthermore, application processor 910 may implement a secure mode of operation, such as Intel® SGX for hosting of a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 5:
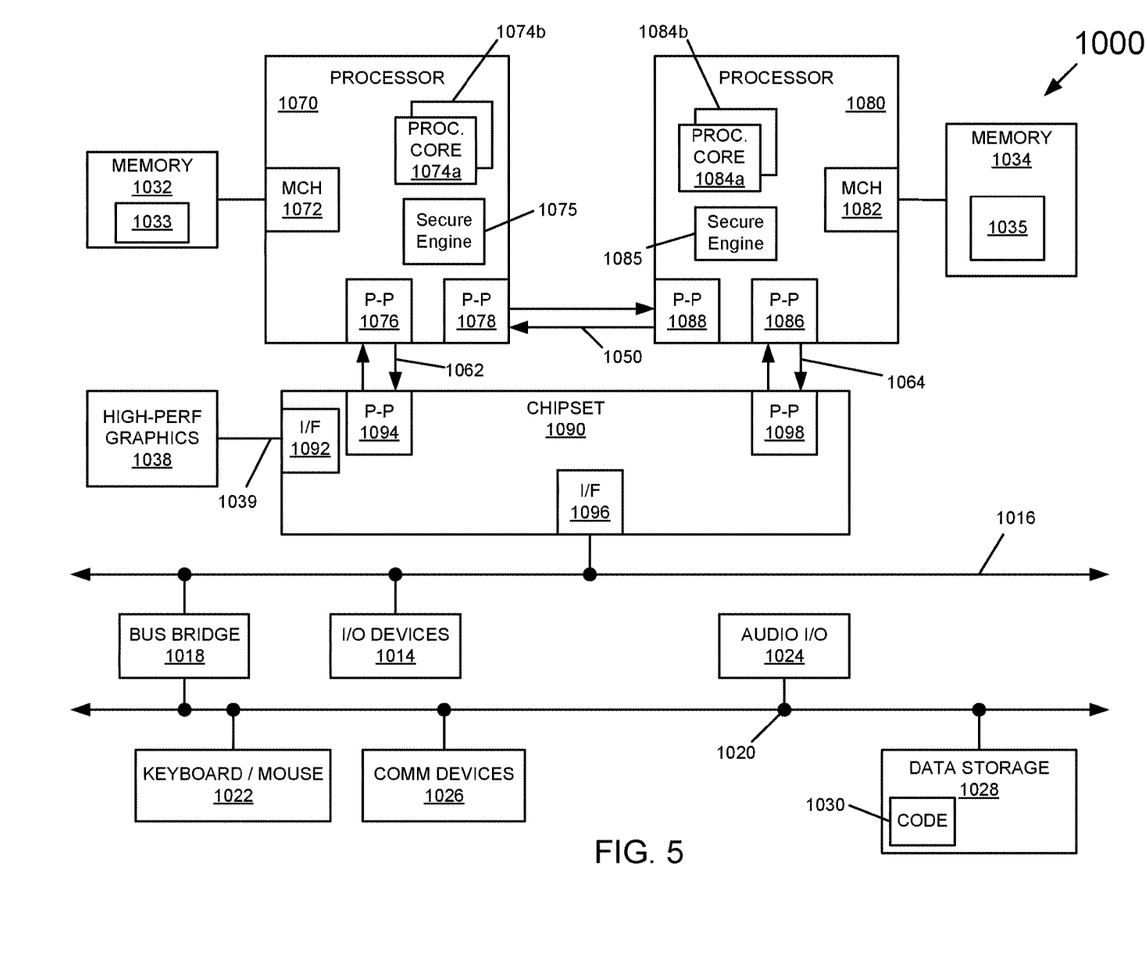
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include a secure engine 1075 and 1085 to perform security operations including the cold boot attack detection and protection measures described herein.

Still referring to FIG. 5, first processor 1070 further includes a memory controller hub (MCH) 1072 and pointto-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. As illustrated, memories 1032, 1034 each include one or more thermal sensors 1033, 1035 to provide thermal information for use in determining whether a cold boot attack is under way. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 6:
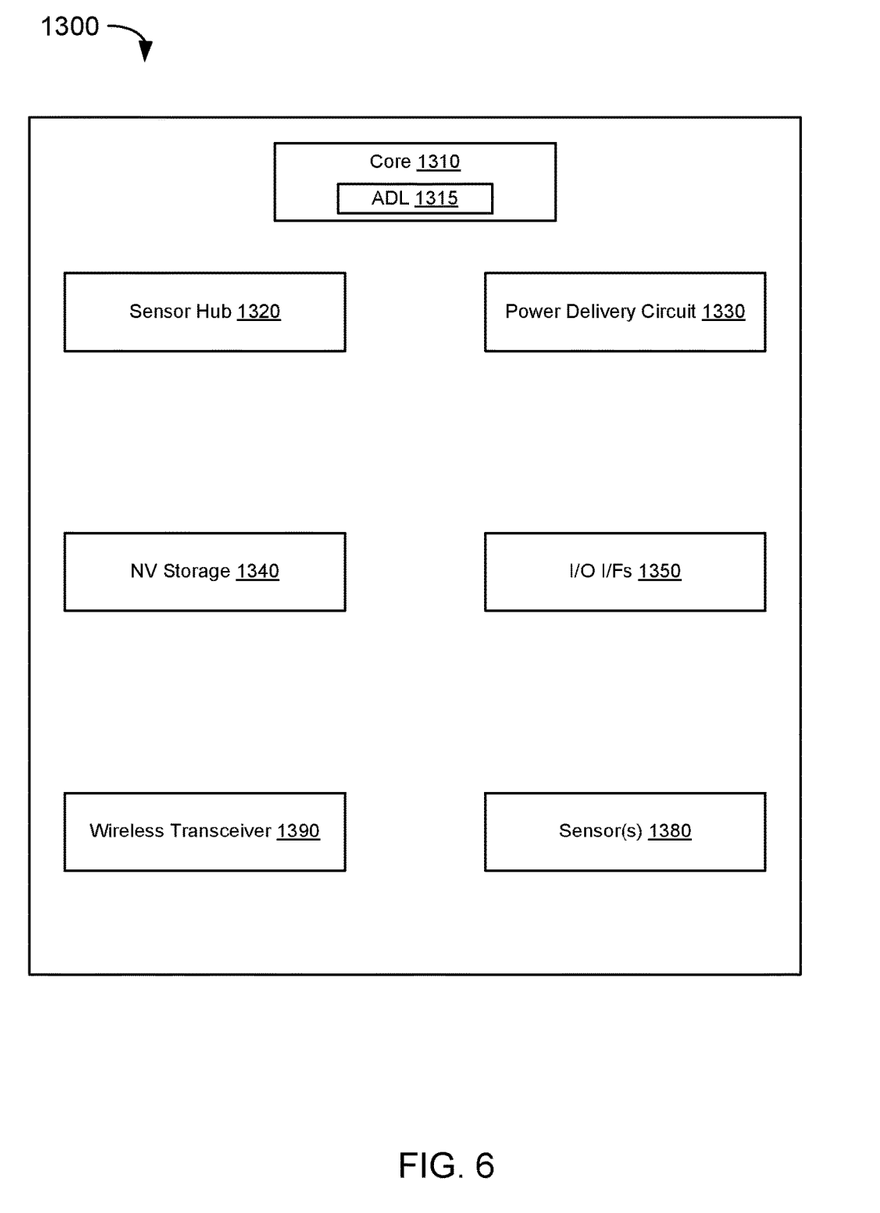
FIG. 6 is a block diagram of a wearable module in accordance with another embodiment.

Embodiments may be used in environments where IoT devices may include wearable devices or other small form factor IoT devices. Referring now to FIG. 6, shown is a block diagram of a wearable module in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental, thermal, and/or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein.

As further illustrated in FIG. 6, core 1310 may include an attack detection logic 1315 as described herein. In some embodiments, this attack detection logic may be implemented within general-purpose circuitry of core 1310. In other cases, attack detection logic 1315 may be part of a TEE or so forth that may, in some cases, be transparent to an OS that executes on core 1310. Understand that in different implementations a wearable module can take many other forms.

The following Examples pertain to further embodiments.

In Example 1, a method comprises: obtaining thermal information from a system memory of a system; calculating a rate of temperature change of the system memory based at least in part on the thermal information; and in response to the rate of temperature change exceeding a threshold, performing at least one protection measure on the system memory.

In Example 2, the method further comprises notifying an administrator regarding an attack in response to the rate of temperature change exceeding the threshold.

In Example 3, the at least one protection measure comprises erasing at least some information stored in the system memory.

In Example 4, the method further comprises erasing the at least some information according to a priority classification.

In Example 5, the method further comprises first erasing encrypted information according to the priority classification.

In Example 6, the at least one protection measure comprises locking at least a portion of the system, to prevent access to the at least portion of the system.

In Example 7, the method further comprises, in response to the rate of temperature change exceeding the threshold, preventing access to the system.

In Example 8, the method further comprises storing the threshold in a configuration storage of a security processor. In an example, the security processor is transparent to a main processor of the system.

In Example 9, the method further comprises: obtaining a first thermal value from a storage; obtaining a second thermal value from the thermal information; and calculating the rate of temperature change based on the first thermal value, the second thermal value and a time duration.

In Example 10, the method further comprises performing the at least one protection measure in response to detection of an unauthorized opening of a platform enclosure.

In another Example, a computer readable medium including instructions is to perform the method of any of the above Examples.

In a further Example, a computer readable medium including data is to be used by at least one machine to fabricate at least one integrated circuit to perform the method of any one of the above Examples.

In a still further Example, an apparatus comprises means for performing the method of any one of the above Examples.

In Example 11, a system comprises: a memory controller to interface with a main memory; a processor coupled to the memory controller, the processor comprising an attack detection circuit to calculate a rate of temperature change of the main memory based at least in part on temperature information from the main memory, the attack detection circuit to raise an exception in response to a result of a comparison of the rate of temperature change to a threshold; and the main memory coupled to the memory controller.

In Example 12, the exception is to identify a cold boot attack.

In Example 13, the main memory comprises one or more dual in-line memory modules including integrated thermal sensors to provide the temperature information.

In Example 14, in response to the exception, the system is to perform at least one protection measure on the main memory.

In Example 15, the at least one protection measure comprises erasure of at least some information stored in the main memory.

In Example 16, the system is to erase the at least some information according to a priority classification.

In Example 17, the processor comprises a security processor comprising the attack detection circuit, where the security processor is transparent to an operating system that is to execute on the processor. In an example, the processor may include the memory controller.

In Example 18, an apparatus comprises: an interface circuit to receive thermal information from a system memory; a calculation circuit to determine a rate of thermal change of the system memory based on a current temperature of the system memory, a prior temperature of the system memory, and a time duration, where at least one of the current temperature and the prior temperature is obtained from the thermal information; and a policy enforcement circuit, in response to a result of a comparison of the rate of thermal change to a threshold, to perform at least one protection measure on the system memory.

In Example 19, the policy enforcement circuit is to erase at least some information stored in the system memory according to a priority classification in which encrypted information is to be first erased according to the priority classification.

In Example 20, the policy enforcement circuit is to lock a platform including the system memory.

In Example 21, an apparatus comprises: interface means for receiving thermal information from a system memory; calculation means for determining a rate of thermal change of the system memory based on a current temperature of the system memory, a prior temperature of the system memory, and a time duration, where at least one of the current temperature and the prior temperature is obtained from the thermal information; and policy enforcement means, in response to a result of a comparison of the rate of thermal change to a threshold, for performing at least one protection measure on the system memory.

In Example 22, the policy enforcement means is to erase at least some information stored in the system memory according to a priority classification in which encrypted information is to be first erased according to the priority classification.

In Example 23, the policy enforcement means is to lock a platform including the system memory.

In Example 24, the apparatus further comprises means for storing the threshold in a configuration storage means.

In Example 25, the apparatus further includes: means for obtaining a first thermal value from a storage means; means for obtaining a second thermal value from the thermal information; and means for calculating the rate of temperature change based on the first thermal value, the second thermal value and a time duration.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one computer readable storage medium comprising instructions that when executed enable a system to:
   obtain, in a first logic of the system, thermal information from a system memory of the system, obtain a first thermal value from a storage, and obtain a second thermal value from the thermal information;
   calculate a rate of temperature change of the system memory based at least in part on the first thermal value, the second thermal value and a time duration; and
   in response to the rate of temperature change indicating a decrease in a temperature of the system memory and exceeding a rate threshold, perform at least one protection measure on the system memory to erase at least some information stored in the system memory, to prevent extraction of the at least some information from the system memory.

2. The at least one computer readable storage medium of claim 1, further comprising instructions that when executed enable the system to issue an attack notification to notify an administrator regarding an attack in response to the rate of temperature change indicating the temperature decrease and exceeding the rate threshold.

3. The at least one computer readable medium of claim 1, wherein the erasure comprises to erase the at least some information according to a priority classification.

4. The at least one computer readable medium of claim 3, further comprising instructions that when executed enable the system to first erase encrypted information according to the priority classification.

5. The at least one computer readable medium of claim 1, wherein the at least one protection measure comprises to lock at least a portion of the system, to prevent access to the at least portion of the system.

6. The at least one computer readable medium of claim 1, further comprising instructions that when executed enable the system to, in response to the rate of temperature change indicating the temperature decrease and exceeding the rate threshold, prevent access to the system.

7. The at least one computer readable medium of claim 1, further comprising instructions that when executed enable the system to store the rate threshold in a configuration storage of a security processor, the security processor transparent to a main processor of the system, the first logic included in the security processor.

8. The at least one computer readable medium of claim 1, further comprising instructions that when executed enable the system to perform the at least one protection measure in response to detection of an unauthorized opening of a platform enclosure.

9. A system comprising:
 a memory controller to interface with a main memory;
 a processor coupled to the memory controller, the processor comprising an attack detection circuit to obtain a first thermal value from a storage, obtain a second thermal value from thermal information from the main memory, and calculate a rate of temperature change of the main memory based at least in part on the first thermal value, the second thermal value and a time duration, the attack detection circuit to raise a hardware exception in response to a result of a comparison of the rate of temperature change to a rate threshold that indicates a decrease in a temperature of the main memory, and in response to the hardware exception, to perform at least one protection measure on the main memory to erase at least some information stored in the main memory, to prevent extraction of the at least some information from the main memory; and
 the main memory coupled to the memory controller.

10. The system of claim 9, wherein the hardware exception is to identify a cold boot attack.

11. The system of claim 9, wherein the main memory comprises one or more dual in-line memory modules, the one or more dual in-line memory modules including integrated thermal sensors to provide the thermal information.

12. The system of claim 9, wherein in response to the hardware exception, platform hardware of the system, under firmware control, is to perform the at least one protection measure on the main memory.

13. The system of claim 9, wherein the system is to erase the at least some information according to a priority classification.

14. The system of claim 9, wherein the processor comprises a security processor, the security processor comprising the attack detection circuit, wherein the security processor is transparent to an operating system that is to execute on the processor, the processor further comprising the memory controller.

15. An apparatus comprising:
 an interface circuit to receive thermal information from a system memory;
 a calculation circuit to determine a rate of thermal change of the system memory based on a current temperature of the system memory, a prior temperature of the system memory, and a time duration, wherein at least one of the current temperature and the prior temperature is obtained from the thermal information; and
 a policy enforcement circuit, in response to the current temperature being lower than the prior temperature and a result of a comparison of the rate of thermal change to a rate threshold, to perform at least one protection measure on the system memory to erase at least some data stored in the system memory, to prevent extraction of the at least some data from the system memory.

16. The apparatus of claim 15, wherein the policy enforcement circuit is to erase the at least some data from the system memory to prevent the extraction of the at least some data from the system memory according to a priority classification in which encrypted information is to be first erased according to the priority classification.

17. The apparatus of claim 15, wherein the policy enforcement circuit is to lock a platform including the system memory.

* * * * *